United States Patent
Su et al.

(10) Patent No.: US 8,788,257 B1
(45) Date of Patent: Jul. 22, 2014

(54) UNIFIED CROSS PLATFORM INPUT METHOD FRAMEWORK

(75) Inventors: Zhe Su, Beijing (CN); Robert S. Jung, Los Altos, CA (US); Brian Stell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 461 days.

(21) Appl. No.: 13/280,642

(22) Filed: Oct. 25, 2011

(51) Int. Cl.
G06F 17/28 (2006.01)
G06F 17/27 (2006.01)
G06F 17/21 (2006.01)
G10L 21/00 (2013.01)

(52) U.S. Cl.
USPC .............. 704/2; 704/3; 704/4; 704/9; 704/10; 704/270; 704/270.1; 704/275

(58) Field of Classification Search
USPC ................. 704/2, 3, 4, 9, 10, 270, 270.1, 275
See application file for complete search history.

(56) References Cited

U.S. PATENT DOCUMENTS

| | | | |
|---|---|---|---|
| 5,594,642 A | 1/1997 | Collins et al. | |
| 7,389,223 B2 | 6/2008 | Atkin et al. | |
| 7,827,256 B2 * | 11/2010 | Phillips et al. | 709/220 |
| 8,090,839 B2 * | 1/2012 | Kumar et al. | 709/227 |
| 8,090,873 B1 * | 1/2012 | Wookey | 709/246 |
| 2002/0169592 A1 * | 11/2002 | Aityan | 704/2 |
| 2003/0037173 A1 * | 2/2003 | Pace et al. | 709/310 |
| 2003/0125927 A1 * | 7/2003 | Seme | 704/3 |
| 2004/0102957 A1 * | 5/2004 | Levin | 704/3 |
| 2005/0267738 A1 * | 12/2005 | Wilkinson et al. | 704/9 |
| 2005/0288920 A1 * | 12/2005 | Green et al. | 704/3 |
| 2007/0005786 A1 * | 1/2007 | Kumar et al. | 709/230 |
| 2012/0165048 A1 * | 6/2012 | Zhu | 455/466 |
| 2012/0265529 A1 * | 10/2012 | Nachtrab et al. | 704/235 |

OTHER PUBLICATIONS

Isokoski, et al. "Architecture for personal text entry methods." In Closing the Gap: Software Engineering and Human Computer Interaction (2003), pp. 1-8. 2003.
Maccari, et al. "Managing infinite variability in mobile terminal software." Software: Practice and Experience, vol. 35, Issue 6, pp. 513-537, May 2005.

* cited by examiner

*Primary Examiner* — Edgar Guerra-Erazo
(74) *Attorney, Agent, or Firm* — Morris & Kamlay LLP

(57) ABSTRACT

The disclosed subject matter provides a system and method for responding to messages related to multilingual input from different operating systems. A central hub component executing on a processor manages communication between connected components, such as computer applications and different processes. An input message may be analyzed by the processor to determine a type of input device. A combination of rule sets may be applied to the input message sets. The first and second rule sets may be selected based on the analysis. The first and second rule sets may be applied to the input message. A probable output message may be generated from the application of each of the rule sets in the combination of rule sets, and forwarded for delivery to an output device.

19 Claims, 4 Drawing Sheets

UNIFIED CROSS PLATFORM INPUT METHOD FRAMEWORK

BACKGROUND

There are a number of different media and communication devices that users interact with on a daily basis. A user may input text into their smartphone, tablet notebook, desktop computer, laptop computer and any number of different computer applications using different types of input devices. The different types of input devices, or input modalities, may be a voice command, a keyboard, a mouse, or a touch, a series of touches or multi-touch gestures on a touch screen, or handwriting devices. Usually the user may only choose one of the modalities to use at a time since these modalities are typically independent from one another. None of the modalities may fulfill the user's requirement in all situations. As a result, users may need to switch among the different modalities from time to time. Some of input methods may also support additional functions such as spell correction and predictive suggestions as a user inputs text.

In addition, particular input methods usually only support one specific language or script. In order to input multilingual content, the user may need to install multiple input methods that may duplicate functionality of other installed input methods. The many different types of operating systems, and APIs associated with the multitude of different input devices makes it difficult and complex to develop an input method for multiple, different platforms.

It would be beneficial to develop a system that allows different input modalities to operate on a common input.

BRIEF SUMMARY

According to an embodiment of the disclosed subject matter, a method for determining a response to a message is provided. An input message from an application may be received by a processor. The input message may be analyzed by the processor to determine a type of the message. Based on the message type, a combination of rule to be applied to the input message sets may be determined. Each rule set may contain rules for converting a payload of the input message into a message result. Combinations of rule sets may be determined to be appropriate for application to the input message based on the analysis of the most probable content of the input message. A first and second rule sets may be selected based on the analysis, and retrieved from data storage. The retrieved first and second rule sets may be applied to the input message. An expected output message may be generated from each rule set based on the application of each rule set to the message payload. A probable output message may be determined from the respective output messages. The probable output result may be output for delivery to the application.

The analyzing of the input message may include parsing the input message to determine the message type, content of the input message, a reply mode flag, a source component identifier, a target component identifier, a message serial number and the payload of the input message. The message type indicates the input device type that was used as an input to the computer application. The message type and corresponding combination of rules may be stored in a data structure. The combination of rule sets may include at least one rule set directed to a rule set for converting a message payload of the input message received from any of a tablet keyboard, a telephone keyboard, a personal digital media device keyboard, a desktop keyboard, a telephone touchpad, a personal digital media device touchpad, a tablet touchpad, a phone microphone, a tablet microphone, and a desktop microphone. The combination of rule sets may be determined dependent upon the user preferences related to the intended recipient. In addition, the retrieved rule set when applied may include operating on a payload of the message to determine an action in response to the input message.

According to another embodiment of the disclosed subject matter, a system for responding to a message may be provided. The system may include a server, a processor and a data storage coupled to the server. The server may receive messages from an external device to be sent to a recipient. The data storage device may store executable code that is used to operate on the received messages. The processor may execute executable code retrieved from the data storage based on content of the received messages. The processor may be configured to receive an input message from an application input by an input device. The processor may analyze the input message to determine the message type. An appropriate combination of rule sets may be determined by the processor based on the input message type. Each rule set may contain rules for converting content of the input message into a message result. The processor may retrieve from the data storage a first rule set and a second rule set in the combination of rule sets based on the determination of the combination of rule sets. The retrieved first and second rule sets may be applied to the input message. A probable output message may be generated after application of each of the first and second rule sets. The probable output message may be forwarded for delivery to an output device.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The computer application user's experience may be enhanced if multiple input modalities worked together and shared the unique functionalities of each of the different modalities. For example, a voice input may leverage a keyboard input method's more powerful language model to provide a more accurate input result. Or, a user may want to use voice input and handwriting at the same time to expedite discussion of a particular symbol, logo, or mathematical equation. This may be referred to as "multimodal" input, as different input modalities (voice input and handwriting) are provided as inputs.

Each input modality may also be dependent on one of many different operating systems. Without regard to the operating system of the computer application, a central input method framework (IMF) hub operating on a processor may receive an input message from a computer application. The IMF hub may identify the type of the input modality and may call the appropriate input methods suitable for use with the particular operating system of the user device. For example, an input from a touchpad entry from a device operating with any operating system is received in a message at the IMF hub, and the IMF hub can analyze the input to determine the input modality based on the message type. Based on the determined message type, the IMF calls the appropriate input methods to provide an input message translation process. A benefit of the current system may be that different input methods have different strengths with respect to the message translation processes, so by having access to many different input methods the IMF hub can choose a combination of different input methods for the determined type of input message. The combinations may be preselected and called based on the input message type determination. The input methods may comprise a set of rules that are applied to the input message payload during analysis of the input message.

Figure 1:
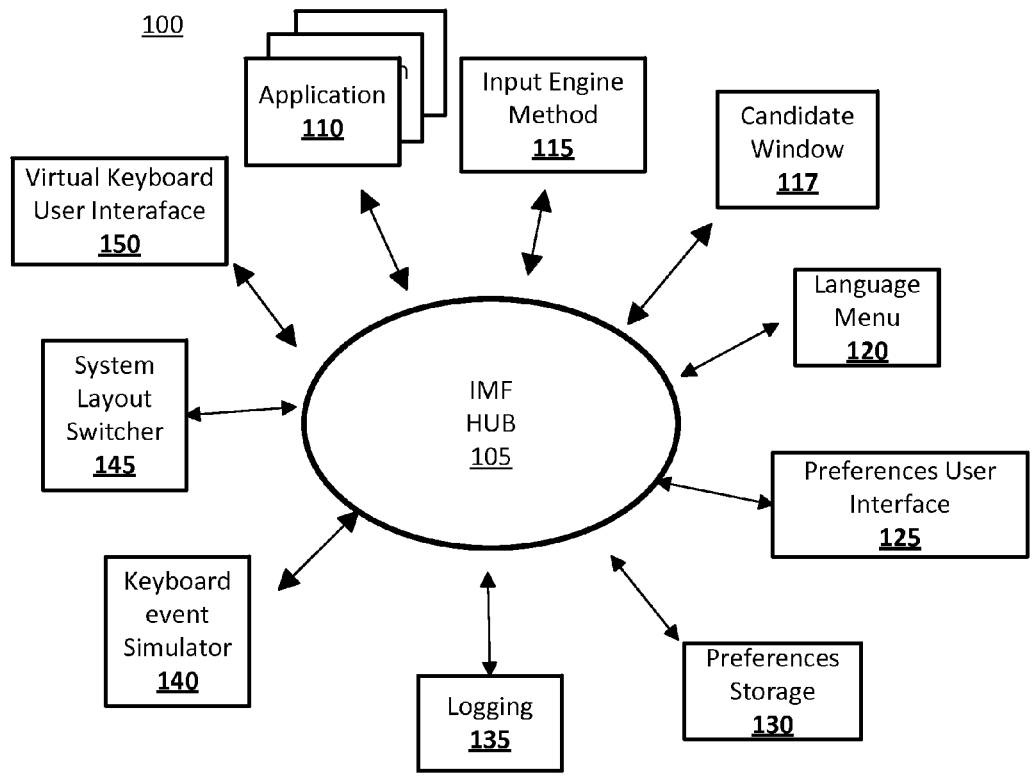
FIG. 1 shows a centralized network configuration according to an embodiment of the disclosed subject matter.

FIG. 1 illustrates a centralized network configuration 100 for providing a response to an input message received from an input device. An input method framework hub 105 may be connected to a plurality of components, such as application 110, input engine method 115, candidate window 117, language menu 120, preferences user interface 125, preferences storage 130, logging 135, keyboard event simulator 140, system layout switcher 145, and virtual keyboard user interface 150.

The IMF hub 105 may manage the components 110-150 by identifying subsets of the components 110-150 that can communicate with the other components. Each of the components 110-150 may generate a message that may require an action to be performed by one of the other components connected to the IMF hub 105. Each of the components 110-150 may respond to messages from other components through the IMF hub 105. The IMF hub 105 may be configured to interact with the many different types of operating systems, and APIs associated with the multitude of different input devices by identifying the system and API attributes of the particular input device.

The application 110 may be any type of computer application that receives user inputs from an input device. For example, application 110 may be a word processing application, a multimedia player application or some other application. The application 110 may be capable of receiving inputs from various devices such as voice commands to a microphone, touches or gestures on a touch screen, keyboard entries, and the like. The application 110 may generate a message that is delivered to the IMF hub 105. There may be multiple applications 110 connected to the IMF hub 105.

Each of the remaining components 115-150 may perform specific tasks at the request of an application 110 and/or another component connected to IMF hub 105. For example, the input engine method 115 may provide the processing to interpret an input received from application 110. In particular, the input engine method 115 may contain different rule sets for interpreting a payload of an input message. For example, a rule set may provide rules for translating from one language to another, rules for spell checking, or language syntax. As another example, the virtual keyboard user interface 150 may require functions provided by processes in the candidate window 117 and input engine method 115 components. Similar relationships may also exist between the other components 120-145.

In an embodiment, additional components may provide cloud services to other components in the framework. A component may generate a message with a message type that designates the cloud services. The component message system may be a fully asynchronous message communication framework that may send a designated message from a source component to a cloud component that supplies a cloud service without waiting for a reply. The result generated by the cloud component may be sent back to the source component asynchronously when ready. This may reduce or minimize the system's dependence on the network, and reduce network traffic.

The above described implementation of the IMF hub may permit it to respond to computer application requests regardless of the operating system or input device API by using an appropriate process from the plurality of different connected components to provide a result message. As mentioned above, the IMF hub may coordinate the interactions between computer applications and the different components. The IMF hub may communicate with the components using different methodologies, such as remote function calls or the like. In an exemplary method, the system may provide a response to a user input into the application. For example, FIG. 2 illustrates an exemplary method according to an embodiment of the disclosed subject matter.

Figure 2:
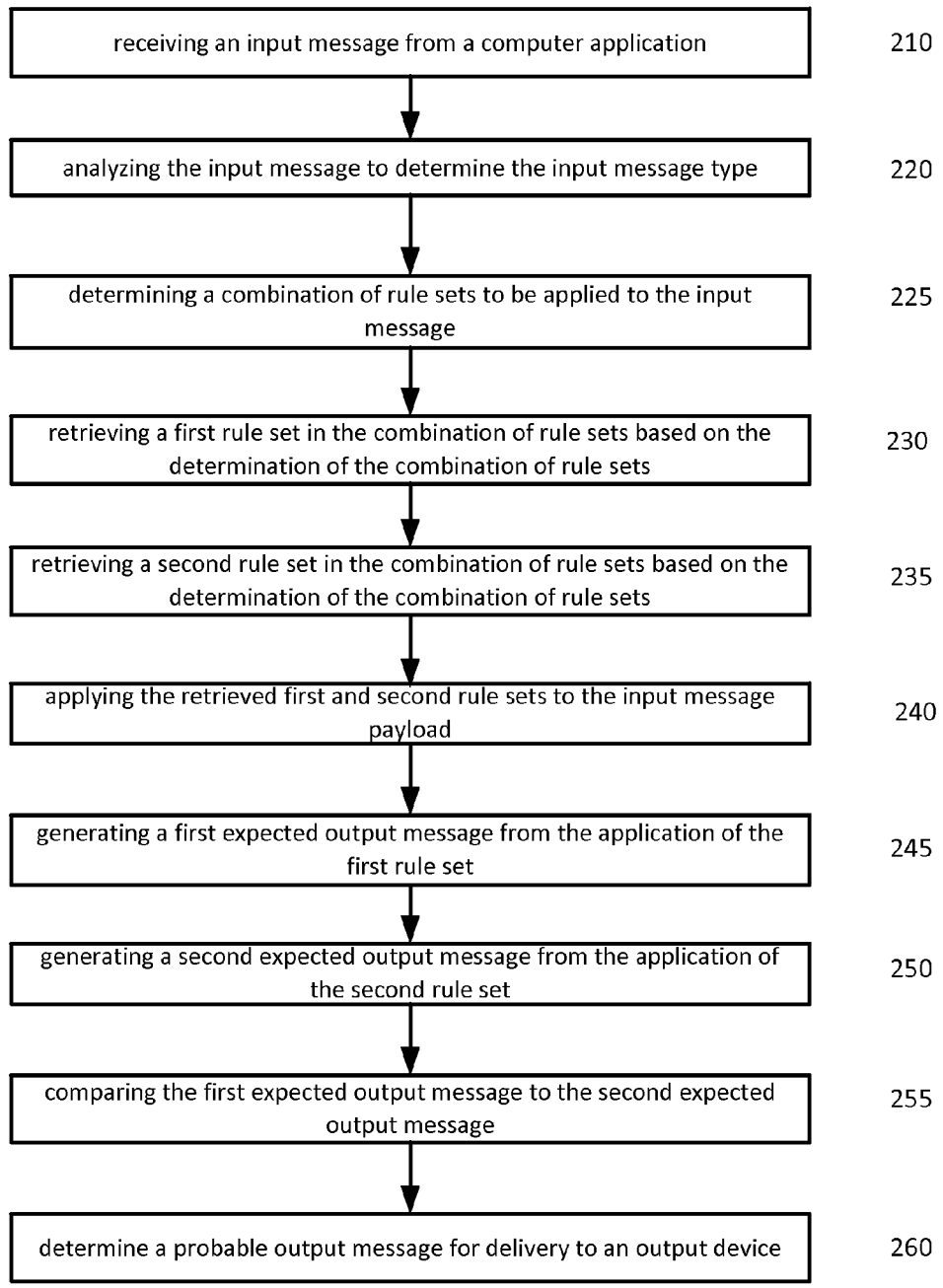
FIG. 2 shows flowchart of a process according to an embodiment of the disclosed subject matter.

As shown in FIG. 2, step 210, a processor configured to perform the functions of the IMF hub may receive an input message from a computer application in response to an input from an input device. As mentioned above, the input device may be a touch screen, keyboard or other type of input device. For example, a user may be typing a response in a first language, such as Japanese, in one text field and a response in a second language, such as English, in a different text field. In a desktop session, while multiple input applications or input areas within an application can co-exist, only one of the input applications or input areas can be the focus at any given time. The user may also be using a combination of keyboard strokes and mouse inputs. The mouse inputs may be gestures, or Japanese character inputs. In particular, common input errors may occur because the user may be uncertain of the English or Japanese language syntax. In other words, the user may not properly arrange the words (subject-verb-object in English) to form a grammatically correct sentence in the respective language. The system may, for example, recognize this error based on the user language preferences or the application language requirements for the particular data fields. In which case, an input engine method component (115 in FIG. 1) may be accessed by the application. For example, the application may generate a request message in response to the user's input. The message may include a distinct message type that is associated with a specific component. Continuing with the example, the message generated by the application 110 may have a message type for the input engine method component 115. Returning to FIG. 2, the processor, at step 220, may analyze the input message to determine the message type, which may correspond to the input device that was used to generate the content or payload of the input message. For example, the processor may parse the input message to determine the input message type, content of the input message, a reply mode flag, a source component identifier, a target component identifier, a message serial number and the payload of the input message. The processor using the information included in the message (e.g., message type, source component identifier, etc.) may identify the actions that need to be performed in response to the message.

In response to the determined message type, the processor may determine a combination of rule sets to be applied to the input message at step 225. Continuing with the above example, the processor may compare the input message type with message types stored in a data structure. The data structure may contain a listing of the input message types and corresponding input engine methods. The corresponding input engine methods that may correspond to the input message type may be an English-language syntax input engine method and a Japanese-language syntax input engine. In addition, input engine methods for keyboards and touch screen gestures may be called to work with the mouse inputs. Alternatively or in addition, the processor may, for example, retrieve multi-touch gesture translation rules, when the identified message type indicates that the input message is from a touch pad; may retrieve voice translation rules, when the identified message type is a microphone; or may retrieve keyboard spell check rules, when the identified message type is a keyboard. More generally, any appropriate combination of translation rules, such as one translation rule, two translation rules, three or more translation rules, may be used that correspond to the received inputs.

Each rule set may contain rules for converting the content or payload of the input message into a message result. The rule set combinations may be predetermined based on an analysis of all the available rule sets, which identifies the combinations of rule sets that provide the most accurate and reliable message results. The combination of rule sets may be determined based on a type of input device that was used to construct the input message, such as a tablet keyboard, a telephone keyboard, a personal digital media device keyboard, a desktop computer keyboard, a smartphone touch screen, a personal digital media device touchpad, a tablet touchpad, a phone microphone, a tablet microphone, handwriting input devices, and a desktop computer microphone. In addition, the determination of the combination of rule sets may also depend upon the spoken or written language used to generate the input message. Furthermore, the combination of rule sets may be determined dependent upon the user preferences related to the intended recipient. The different combinations may provide advantages to the other rule sets, for example, a keyboard spell checking functionality may augment the output decision when a voice input is to be converted to text. The processor may store the different combinations in a data structure, and using the data structure, retrieve the determined rule set combinations from data storage.

At step 230, a first rule set in the determined combination of rule sets may be retrieved from the data storage. To continue with the example, the first rule set may be directed to rules related to English syntax, or touch screen gestures. A second rule set in the determined combination of rule sets may also be retrieved from the data storage at step 235. For example, the second rule set may be directed to Japanese syntax, or keyboard inputs. At step 240, both of the retrieved rule sets may be applied by the processor to the input message payload. In response to the application of the first rule set to the input message payload, the processor may generate a first expected output message to be delivered for output from the computer application at 245. In the example, the Japanese syntax rule set may output an appropriate arrangement of words for the input sentence as the first expected output message. The processor may generate a second expected output message in response to the application of the second rule set to the payload at step 250. The touch screen gestures rule set may, for example, output an expected Japanese character based on the input gestures. The first expected output message may be compared by the processor to the second expected output message at 255, for example to confirm both the correct character or word and the placement of the character or word in the input field. Based on the results of the comparison, a probable output message may be determined, and be forwarded for delivery to the computer application at 260.

Figure 3:
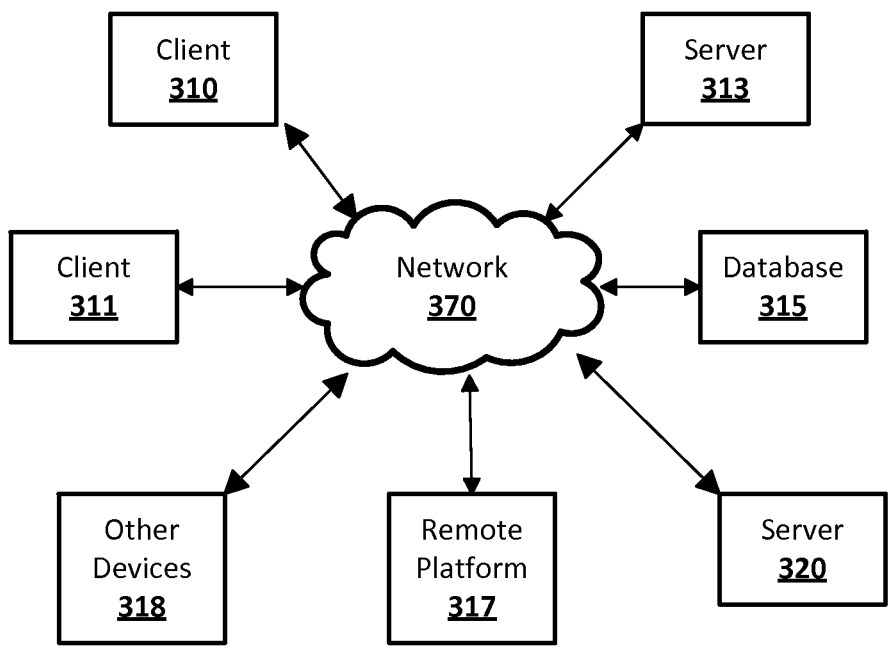
FIG. 3 shows a network configuration according to an embodiment of the disclosed subject matter.

FIG. 3 shows an example network arrangement 300 according to an embodiment of the disclosed subject matter. The clients 310, 311 may be devices that include computer processors for executing program instructions. An example of a client 310, 311 may be a desktop computer, a laptop computer, a smartphone, a tablet computer, and the like. The one or more clients 310, 311 may connect to other client devices 318 via one or more networks 370 in the network arrangement 300. The network 370 may be a local network, wide-area network, the Internet, or any other suitable communication network or networks including wired and/or wireless networks, and may be implemented on any suitable platform. The clients 310, 311, may communicate with one or more servers 313 and/or databases 315. The other client devices 318 may be directly accessible by the clients 310, 311, or one or more other client devices may provide intermediary access such as where a server 313 provides access to resources stored in a database 315. The clients 310, 311 also may access remote platforms 317 or services provided by remote platforms 317 such as cloud computing arrangements and services. The remote platform 317 may include one or more servers 313 and/or databases 315.

Figure 4:
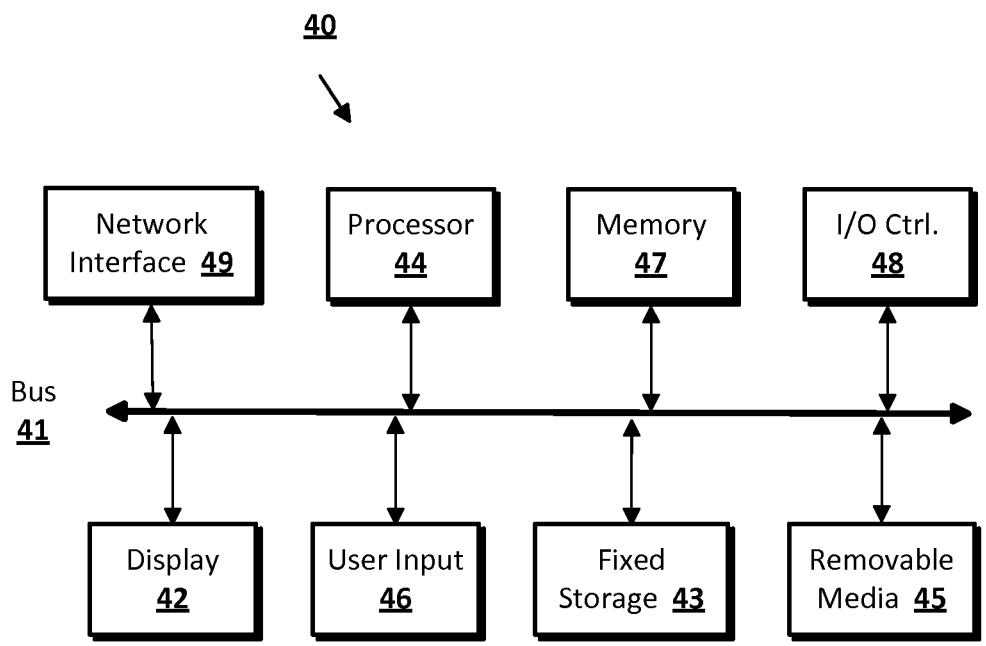
FIG. 4 shows a computer according to an embodiment of the disclosed subject matter.

Embodiments of the presently disclosed subject matter may be implemented in and used with a variety of component and network architectures. FIG. 4 is an example computer 40 suitable for implementing embodiments of the presently disclosed subject matter. The computer 40 includes a bus 41 which interconnects major components of the computer 40, such as a central processor 44, a memory 47 (typically RAM, but which may also include ROM, flash RAM, or the like), an input/output controller 48, a user display 42, such as a display screen via a display adapter, a user input interface 46, which may include one or more controllers and associated user input devices such as a keyboard, mouse, and the like, and may be closely coupled to the I/O controller 48, fixed storage 43, such as a hard drive, flash storage, Fibre Channel network, SAN device, SCSI device, and the like, and a removable media component 45 operative to control and receive an optical disk, flash drive, and the like.

The bus 41 allows data communication between the central processor 44 and the memory 47, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 40 are generally stored on and accessed via a computer readable medium, such as a hard disk drive (e.g., fixed storage 43), an optical drive, floppy disk, or other storage medium 45.

The fixed storage 43 may be integral with the computer 40 or may be separate and accessed through other interfaces. A network interface 49 may provide a direct connection to a remote server via a telephone link, to the Internet via an internet service provider (ISP), or a direct connection to a remote server via a direct network link to the Internet via a POP (point of presence) or other technique. The network interface 49 may provide such connection using wireless techniques, including digital cellular telephone connection, Cellular Digital Packet Data (CDPD) connection, digital satellite data connection or the like. For example, the network interface 49 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 47, fixed storage 43, removable media 45, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for determining a response to an input message, comprising:
    receiving, at a processor, an input message from a computer application, the input message including a message type;
    analyzing, by the processor, the input message to determine the message type;
    determining a combination of rule sets to be applied to the input message, wherein each rule set contains rules for converting a payload of the input message into a message result, and the rule set combinations are made according to a most probable content of the input message;
    retrieving from a data storage a first rule set from the determined combination of rule sets;
    retrieving from the data storage a second rule set in the determined combination of rule sets;
    applying the retrieved first and second rule sets to the input message;
    generating from the application of the first rule set a first expected output message based on the message payload;
    generating from the application of the second rule set a second expected output message based on the message payload;
    determining a probable output message based on the generated first and second expected output messages; and
    outputting the probable output message for delivery to the computer application.

2. The method of claim 1, wherein the analyzing the input message further comprises:
    parsing the input message to determine the message type, content of the input message, a reply mode flag, a source component identifier, a target component identifier, a message serial number and the payload of the input message.

3. The method of claim 1, wherein the message type indicates the input device type that was used as an input to the computer application.

4. The method of claim 1, wherein the message type and corresponding combination of rules are stored in a data structure.

5. The method of claim 1, wherein the combination of rule sets includes at least one rule set directed to a rule set for converting a message payload of the input message received from any of a tablet keyboard, a telephone keyboard, a personal digital media device keyboard, a desktop keyboard, a telephone touchpad, a personal digital media device touchpad, a tablet touchpad, a phone microphone, a tablet microphone, and a desktop microphone.

6. The method of claim 5, wherein the combination of rule sets are determined dependent upon the user preferences related to the intended recipient.

7. The method of claim 1, wherein the applying the retrieved rule set, comprises:
    operating on a payload of the message to determine an action in response to the input message.

8. A system, comprising:
    a server for receiving messages from an external device to be sent to a recipient;
    data storage devices coupled to the server, the data storage devices storing executable code that operates on the received messages;

a processor for executing executable code retrieved from the data storage based on content of the received messages, the processor configured to:

receive an input message from a device according to an input device;

analyze the input message to determine the type of input device;

determine a combination of rule sets to be applied to the input message, wherein each rule set contains rules for converting content of the input message into a message result, and the rule set combinations are made according to a most probable content of the input message;

retrieve from a data storage a first rule set in the combination of rule sets based on the determination of the combination of rule sets;

retrieve from the data storage a second rule set in the combination of rule sets based on the determination;

apply the retrieved first and second rule sets to the input message;

generate a probable output message from the application of the combination of rule sets; and forward the probable output message for delivery to an output device.

9. The system of claim 8, where to execute the retrieving of a first rule set, the processor is further configured to:

retrieve multi-touch gesture translation rules, when the identified message type indicates the input message includes content input from a touch screen.

10. The system of claim 8, where to execute the retrieving of a first rule set, the processor is further configured to:

retrieve voice translation rules, when the identified message type indicates the input message includes content input from a microphone.

11. The system of claim 8, where to execute the retrieving of a first rule set, the processor is further configured to:

retrieve keyboard translation rules, when the identified message type indicates the input message includes content input from a keyboard.

12. The system of claim 8, where to execute the retrieving of a first rule set, the processor is further configured to:

retrieve handwriting translation rules, when the identified message type indicates the input message includes content input from a handwriting device.

13. The system of claim 8, further comprising a server connection to a cloud service component, wherein the processor retrieves either the first or second rule set from the cloud service component.

14. A computer program product having computer program code containing instructions embodied in a non-transitory machine readable medium, a processor executes the instructions to provide a method for determining a response to an input message, the method comprising:

receiving, at a processor, an input message from an input device;

analyzing, by the processor, the input message to determine the type of input device;

determining a combination of rule sets to be applied to the input message, wherein each rule set contains rules for converting content of the input message into a message result, and the rule set combinations are made according to a most probable content of the input message;

retrieving from a data storage a first rule set in the combination of rule sets based on the determination of the combination of rule sets;

retrieving from the data storage a second rule set in the combination of rule sets based on the determination;

applying the retrieved first and second rule sets to the input message;

generating a first expected output message from the application of the first rule set;

generating a second expected output message from the application of the second rule set;

comparing the first expected output message to the second expected output message; and forwarding a probable output message for delivery to an output device.

15. The computer program product of claim 14, wherein the analyzing the input message further comprises:

parsing the input message to determine the input message type, content of the input message, a reply mode flag, a source component identifier, a target component identifier, a message serial number and the payload of the input message.

16. The computer program product of claim 14, wherein the combination of rule sets includes at least one rule set directed to a rule set for converting a message payload of the input message received from any of a tablet keyboard, a telephone keyboard, a personal digital media device keyboard, a desktop keyboard, a telephone touchpad, a personal digital media device touchpad, a tablet touchpad, a phone microphone, a tablet microphone, and a desktop microphone.

17. The computer program product of claim 1, wherein the message type indicates the input device type that was used as an input to the computer application.

18. The computer program product of claim 14, wherein the combination of rule sets are determined dependent upon the user preferences related to the intended recipient.

19. The computer program product of claim 14, wherein the applying the retrieved rule set, comprises:

operating on a payload of the message to determine an action in response to the input message.

* * * * *